United States Patent [19]
Barrier et al.

[11] 4,452,304
[45] Jun. 5, 1984

[54] REMOTELY OPERATED PACKER AND ANCHOR APPARATUS FOR CHANGING A GEOTHERMAL WELLHEAD VALVE

[75] Inventors: Frank W. Barrier, Haughton; Kenneth W. Winterrowd, Shreveport, both of La.

[73] Assignee: Tri-State Oil Tool Industries, Bossier City, La.

[21] Appl. No.: 277,035

[22] Filed: Jun. 24, 1981

[51] Int. Cl.³ .................................................. E21B 33/03
[52] U.S. Cl. ...................................... 166/70; 166/120; 166/133
[58] Field of Search ................ 166/70, 120, 121, 122, 166/212, 133, 217, 215, 216, 140

[56] References Cited

U.S. PATENT DOCUMENTS

| | | | |
|---|---|---|---|
| Re. 22,180 | 9/1942 | Otis | 166/133 |
| 1,842,116 | 1/1932 | Rasmussen | 166/70 |
| 2,117,535 | 5/1938 | Baker et al. | 166/133 X |
| 4,273,372 | 6/1981 | Sheshtawy | 166/215 X |

*Primary Examiner*—Ernest R. Purser
*Attorney, Agent, or Firm*—Vinson & Elkins

[57] ABSTRACT

An improved method of setting a packer in a geothermal well bore under pressure to allow isolation of the wellhead valve including the steps of connecting a lubricator to the wellhead above the valve with the improved packer of the present invention in the lubricator and with a string extending into the lubricator to connect to the packer, running the packer into the well bore below the valve, releasing the packer to allow well pressure to move the packer to set position, disconnecting and recovering the running string, removing the lubricator, repairing or replacing the valve attaching the lubricator, running and connecting the string to the set packer, equalizing pressure across the packer, unsetting the slips and recovering the packer from the well bore. The improved packer includes a piston responsive to fluid pressure in the running string to exert a force on the slip cone in a direction opposite setting movement of the slip cone and a normally closed passage between opposite sides of the packing and a second piston responsive to fluid pressure in the running string to open such passage and equalize pressure between opposite sides of the packing.

4 Claims, 10 Drawing Figures

REMOTELY OPERATED PACKER AND ANCHOR APPARATUS FOR CHANGING A GEOTHERMAL WELLHEAD VALVE

BACKGROUND

Prior to the present invention, geothermal wells were provided with at least one shutoff valve at the surface wellhead and since most such geothermal wells produce sulfur gases which are very corrosive, they generally are provided with two shutoff valves at the surface wellhead. The inclusion of two valves allows the lower one to remain open and to be used only when the upper one is to be replaced or repaired.

While no pertinent prior art is known regarding the use of a set packer to close off a geothermal well string to allow the changing of the wellhead shutoff valve, similar structure has been suggested in an oil well to allow closure of the production string below the Christmas tree to allow removal and replacement of the master valve. Such structure is disclosed in U.S. Pat. No. 3,366,181 issued Jan. 30, 1968. This patent teaches the use of a lubricator and a pressure-operated piston for moving a packer into a well tubing below the master valve, so that the packer can be set allowing the master valve to be replaced. This patent discloses both mechanical and hydraulic set packers, and also suggests that, if desired, the tubing and rod connections to the packer can be removed with the packer set in the tubing below the master valve, and after the master valve has been repaired or replaced, the tubing and rod can be inserted to recover the packer.

There is nothing in the aforementioned patent to suggest that a packer could be run into a geothermal well bore and set responsive to the pressure in such well bore to allow the wellhead valve to be changed or repaired.

SUMMARY

The present invention relates to an improved apparatus and method for sealing a geothermal wellhead below the wellhead shutoff valve so that the valve can be repaired or changed with the well completely under control.

The improved method of the present invention includes the steps of inserting a packer in a lubricator which is connected to a wellhead valve, positively runnig the packer on a string into the well bore below the valve, releasing the packer to allow pressure to set it, disconnecting and recovering the running string from the set packer, removing and replacing the valve, connecting the running string to the packer, releasing the packer from set position by equalizing pressure thereacross and recovering the packer from the well bore. The improved apparatus includes a packer, a lubricator, a running string, an actuator, means for releasably connecting the running string through the lubricator to the packer, means allowing well pressure to set said packer and means for equalizing the pressure across the packer to allow its release.

An object of the present invention is to provide an improved method of running, setting, releasing and retrieving a packer from a geothermal well bore.

Another object is to provide an improved method of changing the wellhead valve on a geothermal well which is simple, safe and quick.

A further object is to provide an apparatus for sealing the well bore of a geothermal well below the wellhead valve which is easy to install and will retain well pressure.

Still another object is to provide an improved packer which may be set in a well bore responsive to well pressure and may be simply and quickly released.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
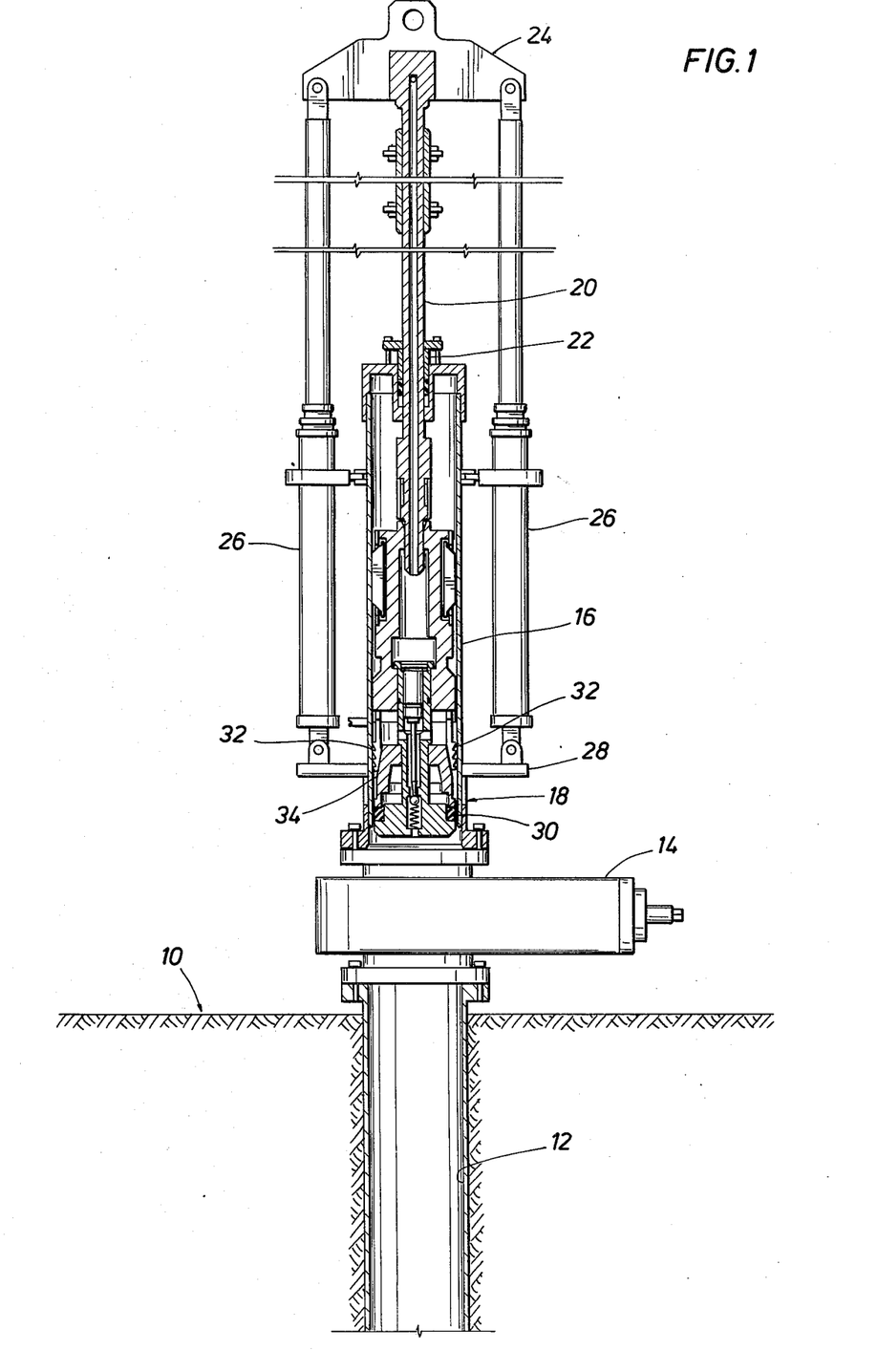
FIG. 1 is a sectional view of a geothermal wellhead with the improved packer positioned in a lubricator connected above the wellhead valve.

In FIG. 1, geothermal well 10 is provided with casing 12 to which valve 14 is connected at the wellhead to shut off flow from well 10. When valve 14 is to be replaced or removed, repaired and reinstalled, lubricator 16 is connected to valve 14, as shown, with packer 18 positioned therein ready for use. Running string 20 is releasably connected to packer 18 as hereinafter described, and extends through packing gland 22 in the upper end of lubricator 16 and is connected by yoke 24 to actuators 26 which are supported on plate 28. Plate 28 is supported on lubricator 16 to be free to rotate therearound but prevented from movement axially thereof.

Figure 2:
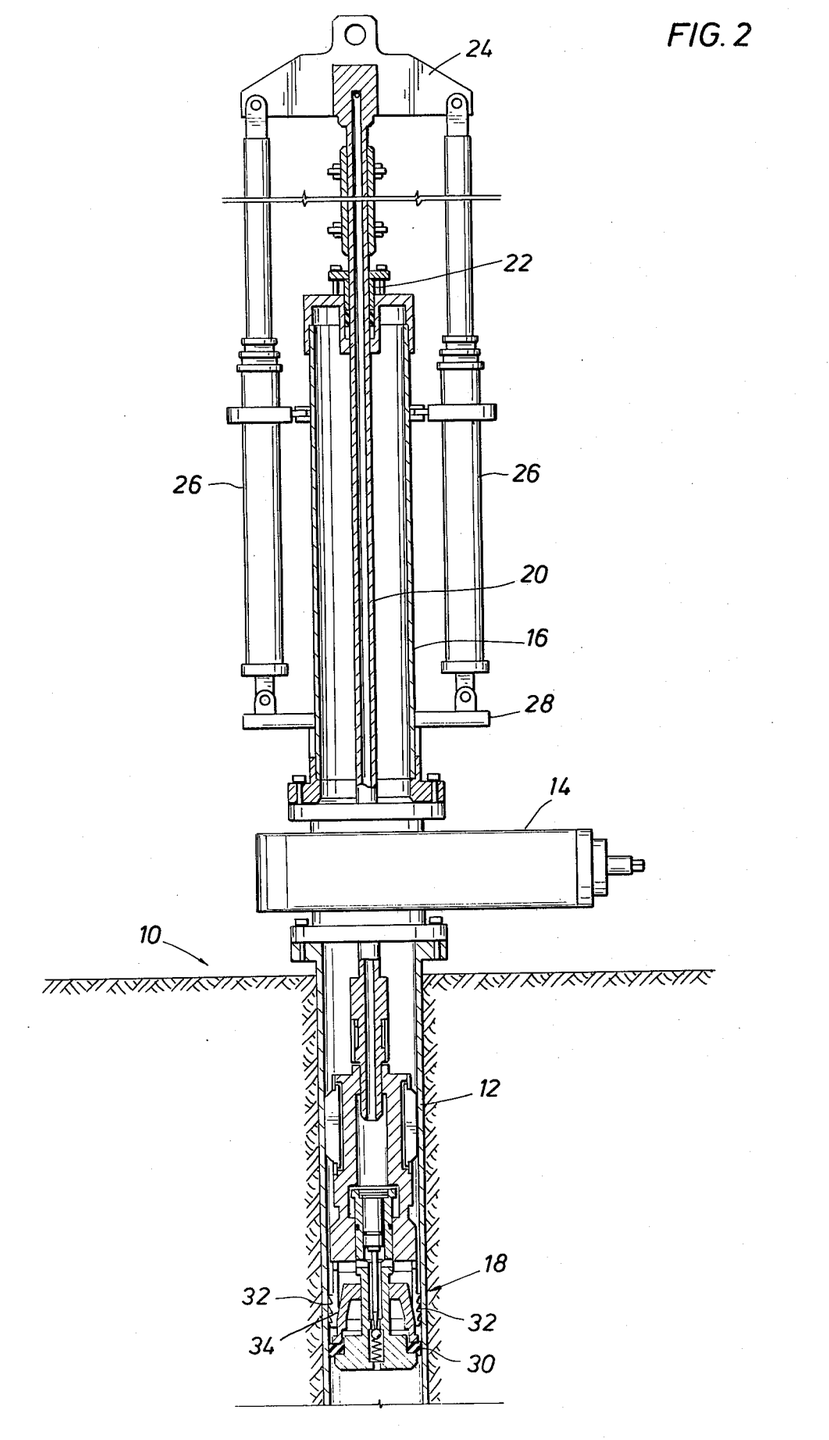
FIG. 2 is a view similar to FIG. 1 with the packer set in the well bore below the valve.

When the apparatus is in place as shown in FIG. 1, valve 14 is then opened to admit pressure to lubricator 16 which is originally connected to valve 14 when valve 14 is closed. To position packer 18 within casing 12, actuators 26 are retracted, which movement lowers string 20 through gland 22 and lowers packer 18 to the position shown in FIG. 2. Pressure within packer 18 and the open passage prevents setting of its packing 30 and slips 32 (as hereinafter explained) until it is in its preselected position. Then with the release of pressure and the closing of the pressure equalizing passage packer18 is set as shown in FIG. 2.

Figure 3:
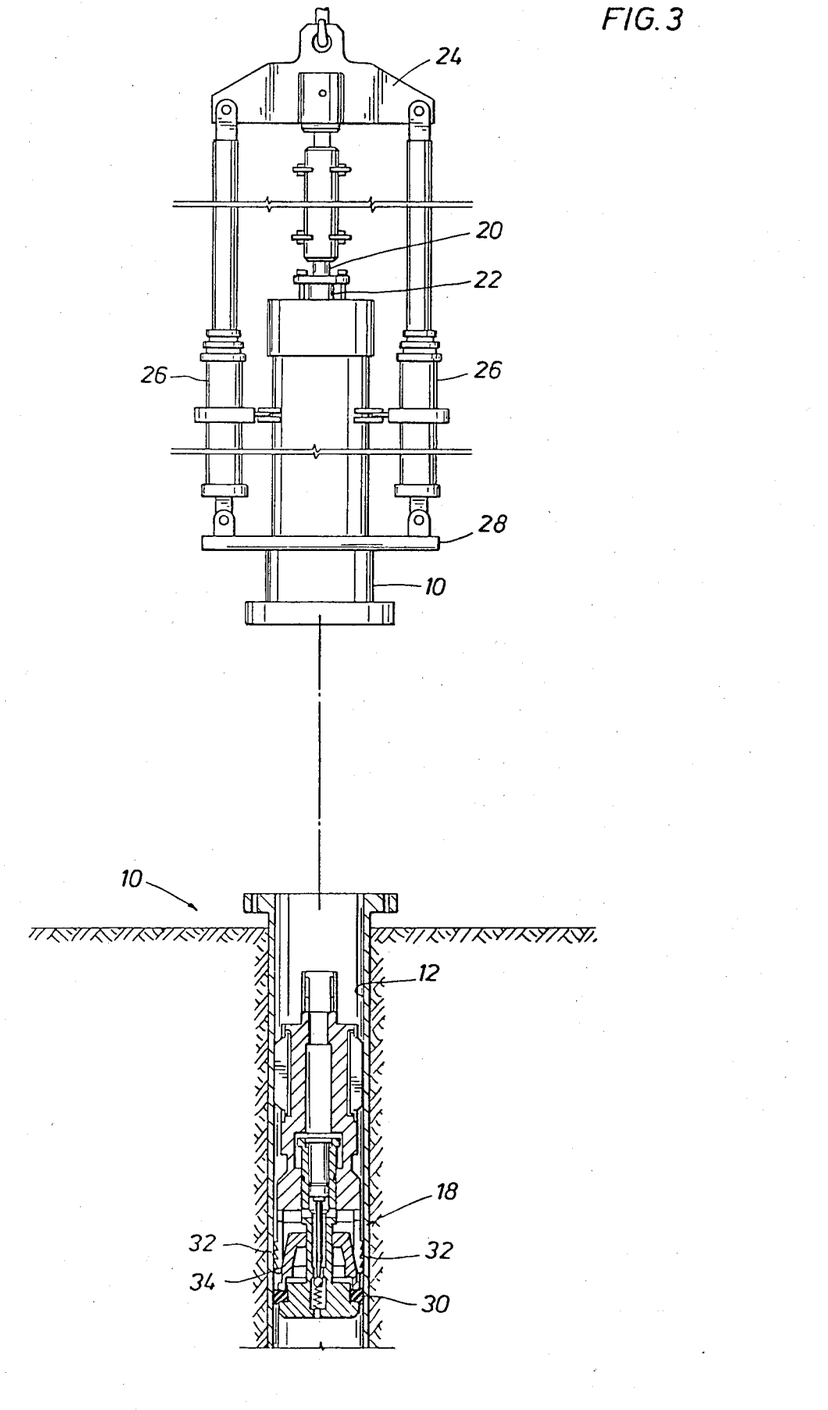
FIG. 3 is another similar view with the running string released and the valve and lubricator disconnected from the wellhead.
Figure 4:
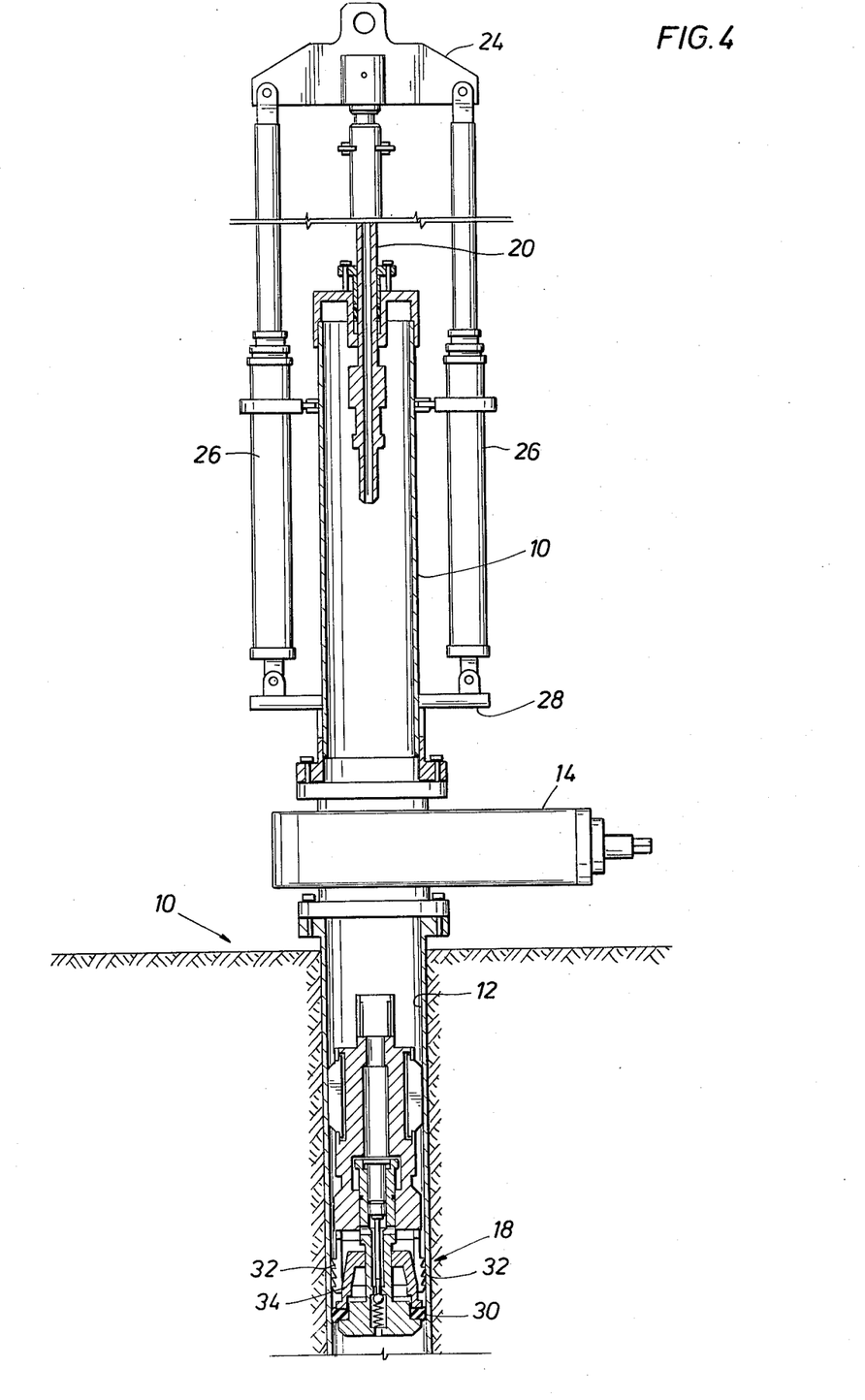
FIG. 4 is another similar view with a valve and lubricator connected to the geothermal wellhead.
Figure 5:
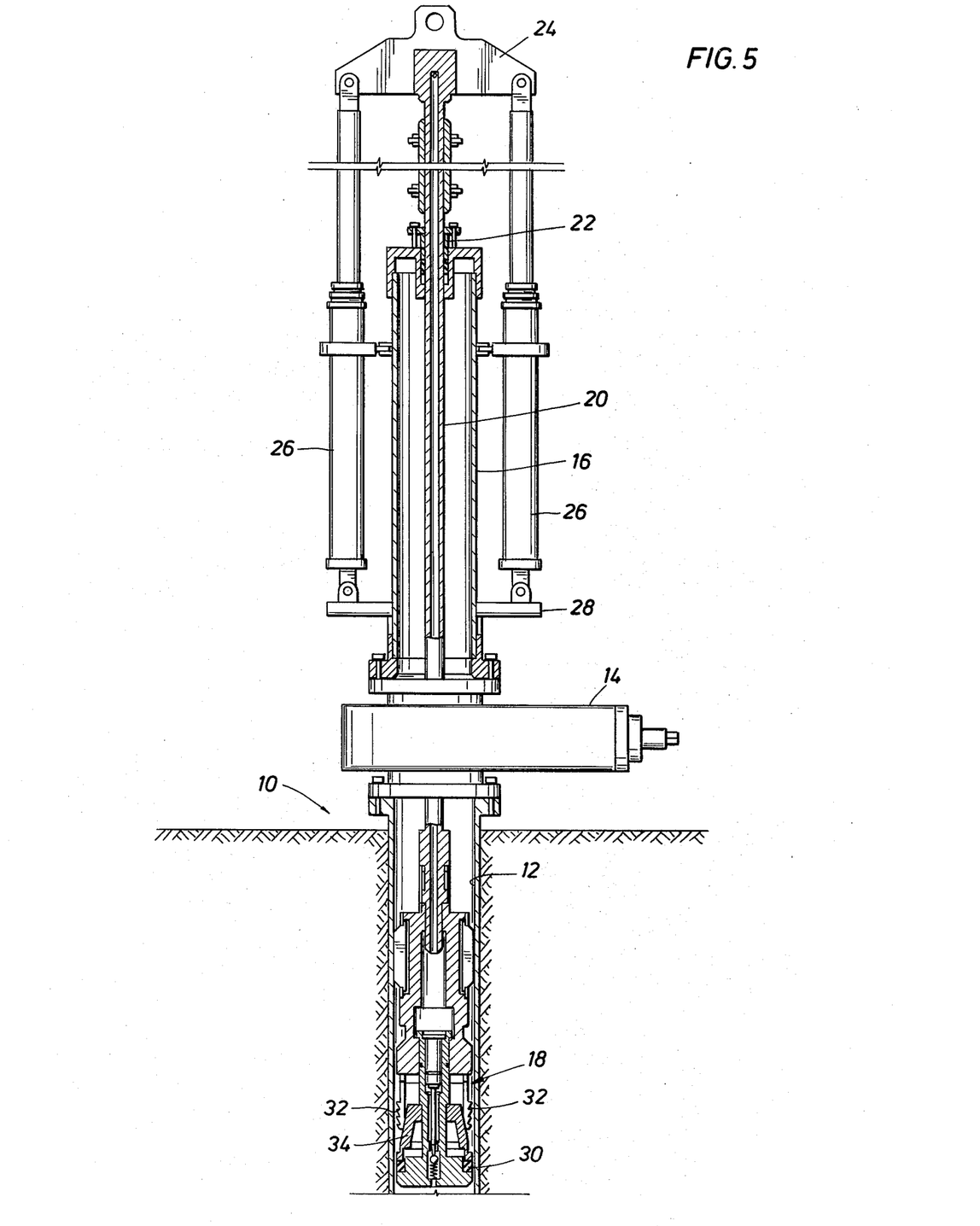
FIG. 5 is another view with the running string connected to the packer and showing the release of the packer.

With packer 18 set, running string 20 is disconnected by rotation and pulled by the extension of actuators 26. Then valve 14 can be removed after the removal of lubricator 16 as shown in FIG. 3. A repaired or replacement valve 14 is connected to the wellhead and lubricator is connected to valve 14 as shown in FIG. 4. The retraction of actuators 26 moves running string 20 into engagement with packer 18 and rotation provides the connection so that the pressure equalization passage can be opened and the packer unset by removing cone 34 from behind slips 32. This position is shown in FIG. 5. Thereafter packer 18 is recovered into lubricator 16 and with valve 14 closed, lubricator 16 is disconnected therefrom and normal operations of geothermal well 10 continued.

Figure 6:
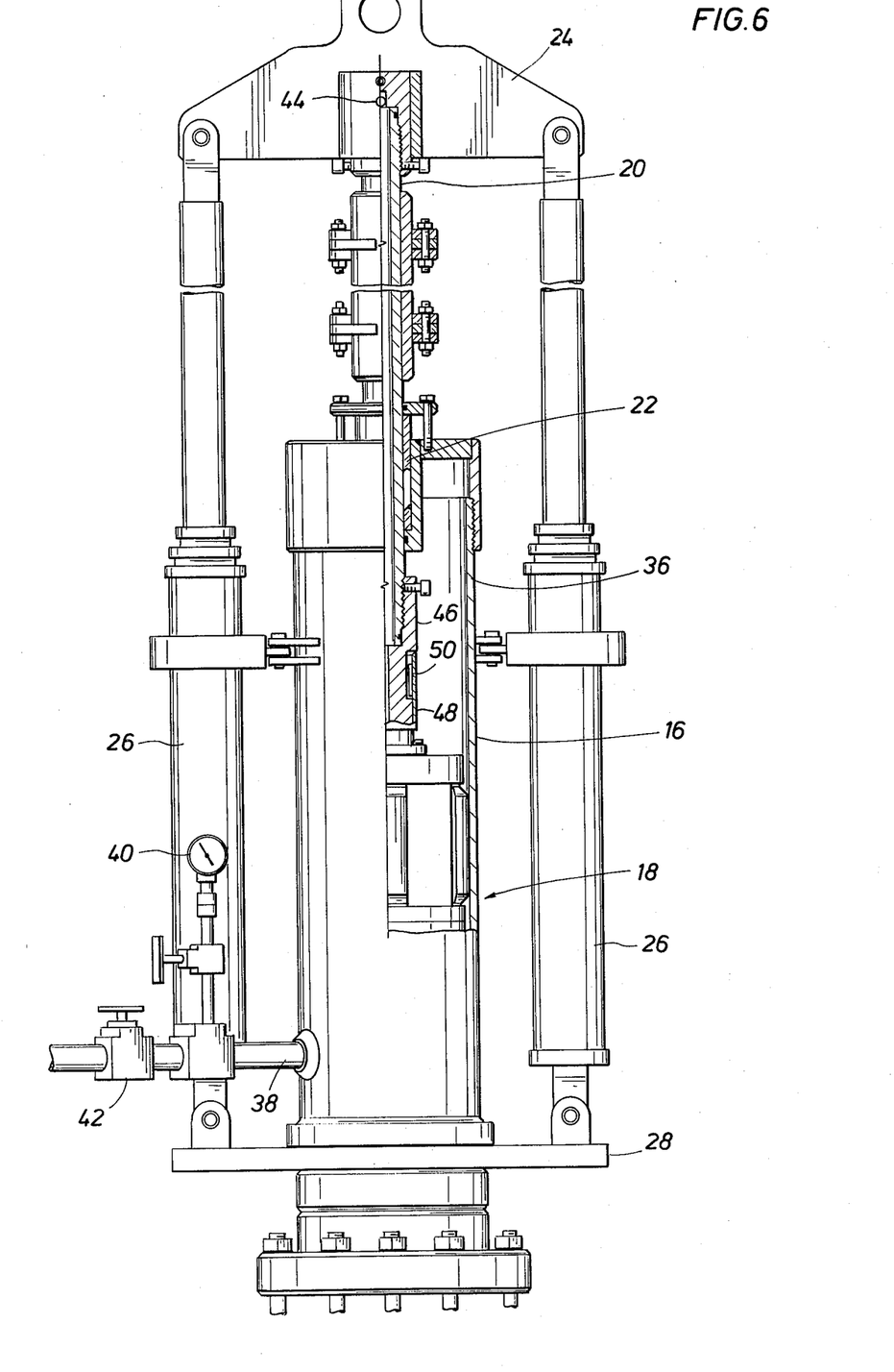
FIG. 6 is a view partially in section showing the lubricator and the running string therein.
Figure 10:
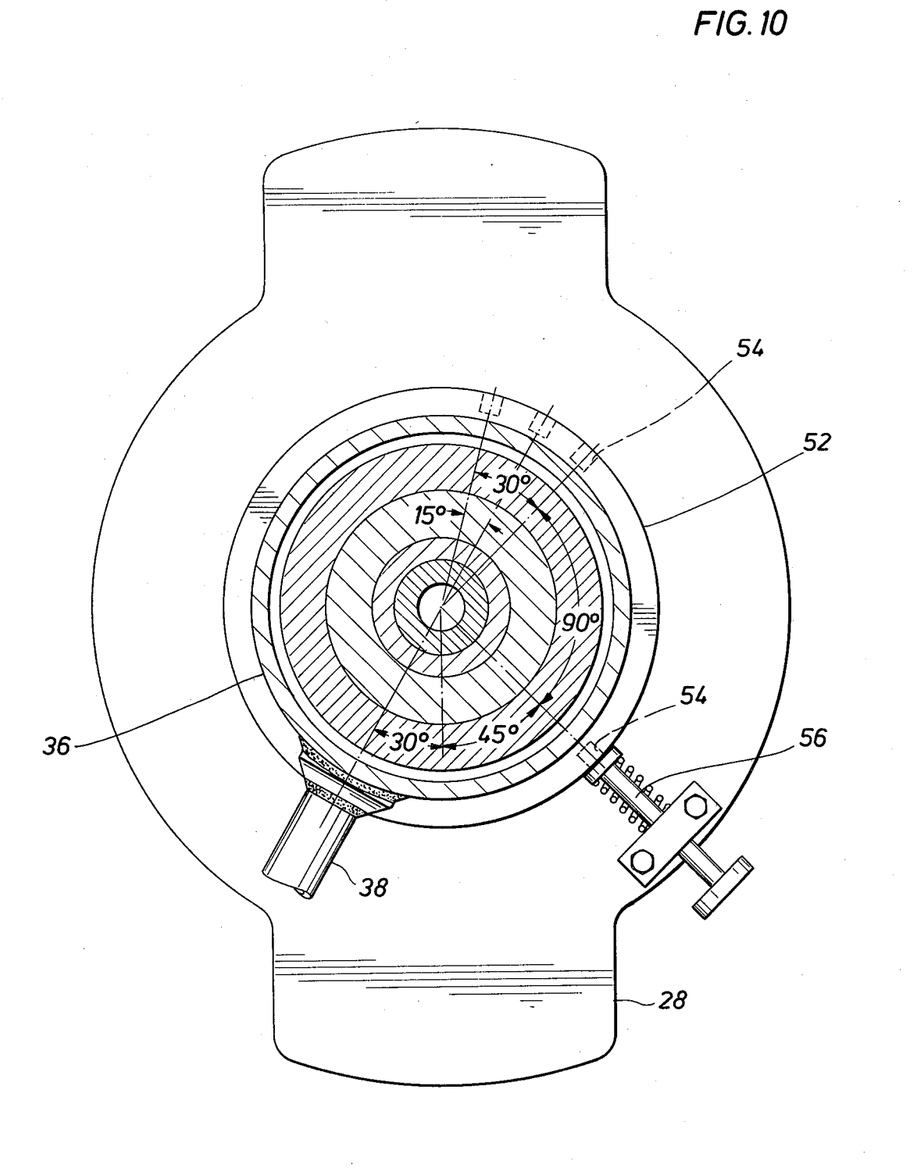
FIG. 10 is a sectional view of the lubricator taken along line 10—10 in FIG. 7 with the packer omitted.

In FIG. 6, running string 20 is shown connected to yoke 24 and extending through packing gland 22 in the upper end of lubricator 16 with the upper portion of packer 18 shown in lubricator 16. Lubricator housing 36 is provided with outlet 38 which is connected to pressure gauge 40 and to bleed valve 42 so that there is an internal indication of the pressure within lubricator and to allow such pressure to be exhausted prior to its disconnection from valve 14. The interior of running string 20 is hollow and communicates through port 44 in yoke 24 to a suitable source of pressure (not shown) and a vent (not shown) with appropriate valving (not shown) so that pressure may be applied to or relieved from the interior of string 20. Extension 46 is secured to the lower end of running string 20 and coacts with J body 48 which is connected to packer 18 to provide the usual type of J slot connection 50 so that running string 20 may be rotated and disconnected from or reconnected to packer 18. As previously mentioned and as clearly shown in FIGS. 7 and 10 plate 28 is free to rotate with respect to lubricator housing 16. The exterior of ring 52 which is secured to housing 36 is provided with holes 54 which coact with spring loaded pin 56 mounted on plate 28 to accurately position running string 20 with respect to packer 18 so that the J slot connection can be disconnected and reconnected without difficulty. Plate 28 is mounted around the lower end of housing 36 immediately below ring 52 and above spacer ring 58 which abuts the upper end of flange 60 threaded onto the lower end of housing 36.

Figure 7:
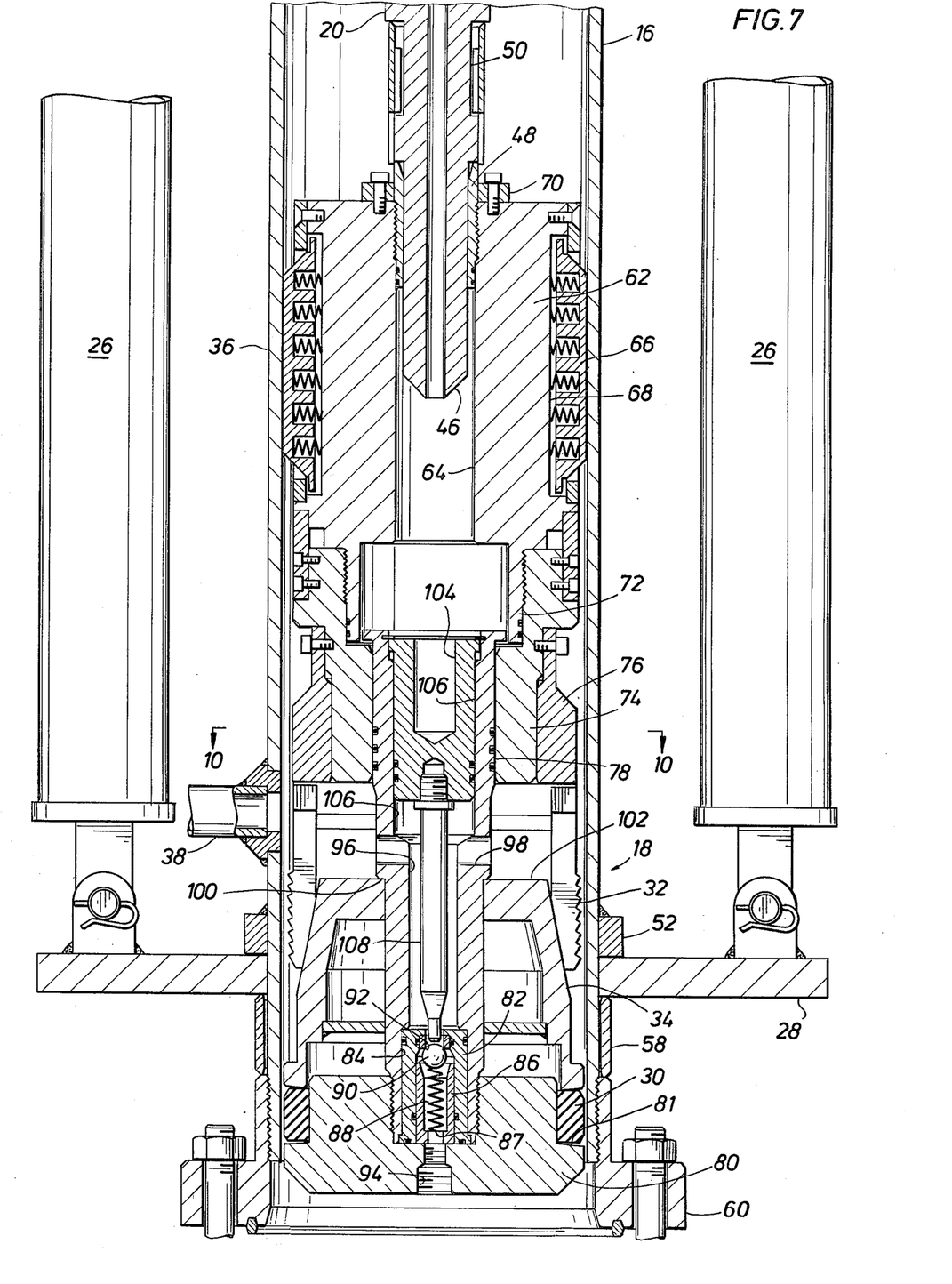
FIG. 7 is a detailed sectional view of the preferred embodiment of the improved packer of the present invention with the lubricator in unset position.

Packer body 62 has bore 64 extending therethrough and friction blocks 66 are mounted in recesses 68 in the exterior of body 62. J body 48 is threaded into bore 64 and is held against rotation by locking bar 70. Body 62 terminates in annular rim 72 which is threaded into slip holder 74. Slip retainer 76 is secured to slip holder 74 to prevent slips 32 from moving out of their position in slip holder 74.

Piston 78 is slidably mounted in annular rim 72 and extends through slip holder 74, slip cone 34 and has nut 80 threaded on its lower end. Packing 30 is positioned around nut 80 between its upwardly facing shoulder 81 and the lower end of slip cone 34. Seat housing 82 is held in recess 84 in the lower end of piston 78 by nut 80 and spring housing 86 is retained within spring housing 82 by nut 80. Spring housing 86 provides a shoulder 87 against which spring 88 abuts to urge ball 90 toward engagement with seat 92 in seat housing 82. When on seat 92, ball 90 closes flow through port 94 in nut 80, seat 92 bore 96 in piston 78 and to the upper side of packing 30 through ports 98 in piston 78. Shoulder 100 on piston 78 engages face 102 on cone 34 so that when piston 78 is in its downward position cone 34 is withdrawn from under slips 32.

Secondary piston 104 is slidably positioned in bore 106 of piston 78 and includes arm 108 extending downward toward ball 90. When piston 104 is in its upper position as shown in FIG. 7, it has its lower end spaced above ball 90 and when it travels to its lower position, it engages ball 90 to force it off seat 92 to thereby allow flow through seat 92 and through port 98 in piston 78 which equalizes pressure on opposite sides of packing 30.

Figure 8:
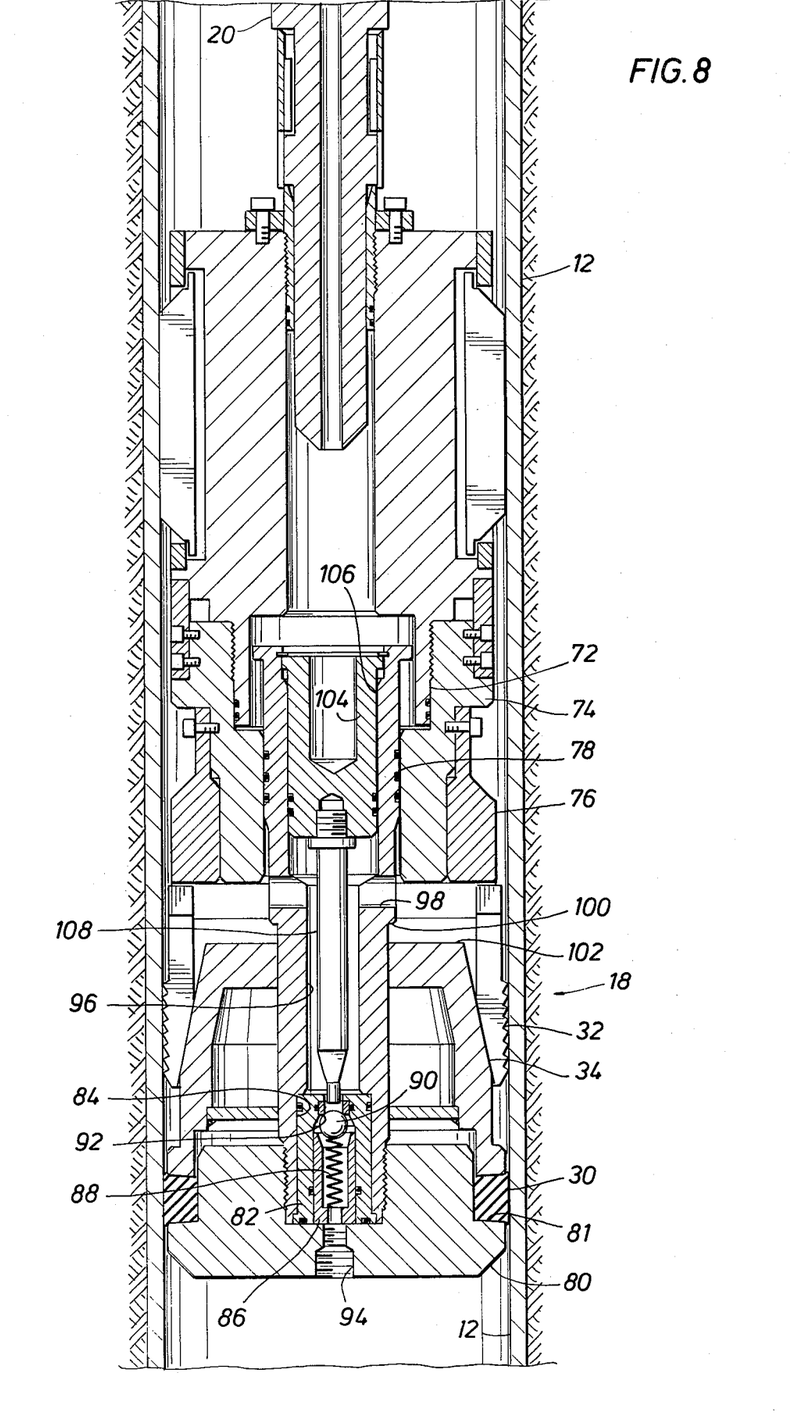
FIG. 8 is a detailed view similar to FIG. 7 showing the packer in set position in the casing of the lubricator.

The improved packer 18 of the present invention is positioned within lubricator 16 when it is ready for use and is in the unset position shown in FIG. 7. Packer 18 is run into well casing 12 by the action of actuators 26 to the position shown in FIG. 8. During the running of packer 18 it is held against moving to its set position by fluid pressure applied through port 44 (shown in FIG. 6) and the interior of running string 20 so that it is applied to the upper side of pistons 78 and 104. This fluid pressure is sufficiently high to hold pistons 78 and 104 in their lower positions which prevents movement of slip cone 34 with respect to slips 32 and also causes arm 108 to move ball 90 below seat 92 so that fluid pressure in casing 12 below packer 18 is equalized between opposite sides of packing 30. When packer 18 is positioned at the level in casing 12 where it is to be set, pressure on port 44 is vented allowing pistons 78 and 104 to move upwardly. This closes the equalizing communication and moves piston 78 upwardly to the position shown in FIG. 8. The pressure in casing 12 below packer 18 provides the force to move slip cone 34 under slips 32 to wedge slips 32 outwardly into tight engagement with the interior of casing. This upward movement also continues to move it into sealed position with the interior of casing 12. In this position packer 18 is set and sealed in casing 12 and will contain the well pressure. Running string 20 is disconnected from packer 18 by rotation of plate 28, actuators 26 and yoke 24 after the pulling of pin 56 from hole 54. This rotation is continued until pin 56 reaches the desired one of holes 54 which are known to place J slot connection 50 in its open position; to allow release of running string 20 from packer 18. Running string 20 is then retrieved into lubricator 16 and replacement of valve 14 proceeds as previously described.

Figure 9:
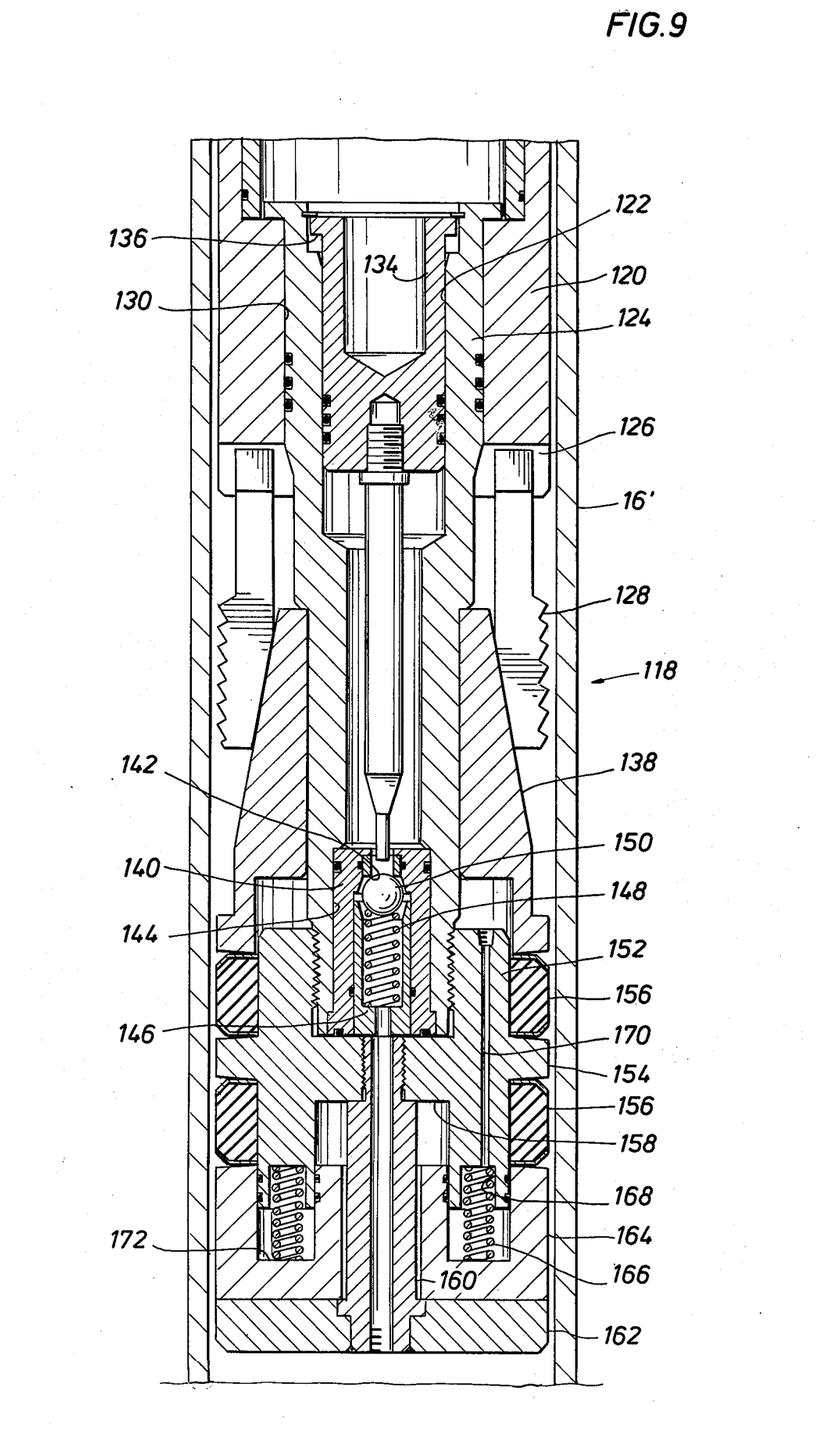
FIG. 9 is a detailed sectional of a modified form of improved packer of the present invention in set position in the well bore.

A modified form of packer 118 is shown in a lubricator 16' in FIG. 9. Such packer includes a body 120 having a bore 122 in which piston 124 is slidably positioned and T slots 126 which retain slips 128. Piston 124 has a central bore 130 in which secondary piston 134 is slidably positioned and an external downwardly facing shoulder 136 which engages the upper end of slip cone 138 to hold cone 138 from moving to set position until piston 124 is moved. Seat housing 140 including seat 142 is positioned in recess 144 in the lower end of piston 124 with spring housing 146 positioned therein to urge spring 148 against ball 150 which urges ball 150 toward engagement with seat 142. Packing carrier 152 is threaded onto the lower end of piston 124 and has an exterior flange 154 against which packing elements 156 are positioned and inner flange 158 which engages and retains seat housing 140 and spring housing 146 within recess 144. Sleeve 160 is threaded into packing carrier 152 and has flange 162 secured to its lower end to retain spring ring 164 in position as shown when packer 118 is in unset position. Springs 166 are positioned in recesses 168 in packing carrier 152 and urge ring 164 away from carrier 152. Port 170 extends through carrier 152 to provide communication to recess 168 in carrier 152 and annular recess 172 of ring 164. Seals 174 are positioned to provide a seal so that the pressure on the upper side of carrier 152 is retained within recess 172. Thus when the pressure on the top of carrier is reduced there is a pressure differential over the area of the annular recess 172 which moves spring ring 164 upward to compress lower packing element 156 into set position. This pressure differential will hold the lower packing element 156 in set position until ball 150 is unseated and pressure is equalized. In all other respects packer 118 operates in the same manner as that described in relation to packer 18.

What is claimed is:

1. A well packer comprising
a tubular body with a bore,
a slip cone,
a plurality of slips activated by said cone,
a packing element,
means supporting said cone, said slips and said packing element from said body,
means for releasably connecting a running string to the upper end of the body,
a piston slidable in the body bore,
said piston holding the slip cone in unset position responsive to fluid pressure in the running string whereby on release of fluid pressure in the running string said slip cone moves responsive to well pressure below the packing element to set said slips and said packing element.

2. A well packer according to claim 1 including
a second piston slidably mounted in an axial bore in said piston,
a passage communicating between opposite sides of the packing element, and
means normally closing said passage,
said second piston moving downward responsive to fluid pressure in the running string to open said passage and thereby equalize pressure across said packing.

3. A well packer according to claim 2 wherein
said closing means is a ball valve,
a seat surrounding said passage, and
a ball moving to and from engagement with said seat.

4. An apparatus for changing the shut off valve on the wellhead of a geothermal well comprising
a lubricator,
means for connecting the lubricator to the shut off valve,
a packer positioned in said lubricator,
a running string releasably connected through the lubricator to the packer,
said packer including
a set of slips,
a packing element,
a slip cone to set said slips and said packing element,
a pressure responsive means for retaining the slip cone in unset position, and
means for holding fluid pressure through said running string and to said pressure responsive means,
means for extending said running string through said lubricator to move the packer into the well bore below the valve, and means for releasing pressure from the running string.

* * * * *